Patented Jan. 28, 1947

2,415,000

UNITED STATES PATENT OFFICE 2,415,000

PRODUCTION OF ESTERS

Arthur E. Bearse and Richard D. Morin, Columbus, Ohio, assignors, by mesne assignments, to Standard Oil Company, Chicago, Ill., a corporation of Indiana No Drawing. Application June 27, 1944, Serial No. 542,428

11 Claims. (Cl. 260—497)

This invention relates to the production of esters by a reaction between organic acids or their anhydrides and olefin hydrocarbons in the presence of halide catalysts and it pertains more particularly to the direction of the reaction toward the formation of particular esters and the avoidance of side reactions such as polymerization.

It is known that acetic acid may be reacted with ethylene by means of boron fluoride and hydrogen chloride, but heretofore such a reaction has been characterized by undesirable reactions such, for example, as the formation of higher molecular weight esters. Moreover, it is well known that propylene and the higher olefins are rapidly polymerized by boron fluoride, especially in the presence of hydrogen halides. It was wholly unexpected, therefore, that olefins could be reacted readily with organic acids in the presence of boron fluoride and a hydrogen halide to give specific low molecular weight esters with substantially no polymerization. An object of our invention is to avoid undesirable reactions such as polymerization and the formation of esters of higher molecular weight and to effect more complete utilization of the charging stock in the formation of a specific low molecular weight ester. A further object is to produce particular esters which cannot be produced readily by any other known methods. A particular object is to provide a method and means for the production of esters from secondary olefins, which are known to be readily polymerized by boron fluoride and hydrogen halide. Other objects will be apparent as the detailed description of the invention proceeds.

Our preferred catalyst is boron fluoride promoted with a hydrogen halide such as hydrogen chloride or hydrogen fluoride. Such catalysts offer many advantages over sulfuric acid, phosphoric acid, aluminum chloride, etc. because of the remarkable effectiveness of the boron fluoride-hydrogen halide catalyst and the facility and completeness with which the catalyst may be separated from reaction products and recovered for reuse.

We have discovered that if the gaseous boron fluoride is added to the reaction mixture subsequent to the addition of the olefin thereto undesirable reactions may take place but that if the boron fluoride is first admixed with the organic acid and the resulting mixture is contacted with the olefin in the presence of a hydrogen halide the reaction can be controlled to a remarkable extent and directed toward the production of the desired ester. Although we prefer to mix the hydrogen halide with the organic acid and boron fluoride prior to addition of the olefin, we may, if desired, add a mixture of hydrogen halide and olefin to a mixture of the organic acid and boron fluoride, or we may add the hydrogen halide subsequent to the addition of the olefin to the organic acid and boron fluoride. According to our process the tendency of the boron fluoride to promote polymerization of olefins is greatly reduced by mixing it first with the organic acid, while the tendency to promote the formation of esters is greatly increased by the presence of a hydrogen halide.

For example, when 480 grams of glacial acetic acid, 115 grams of anhydrous hydrogen fluoride, 365 grams of propylene and 35 grams of boron fluoride were charged into a bomb in that order, evolution of heat was noted immediately upon the addition of boron fluoride and within 5 to 10 minutes the temperature within the bomb had reached about 120° C. Practically no pressure was observed on the bomb in this case and analysis of the resulting reaction product showed that the propylene had been almost completely converted into polymer with little or no formation of isopropyl acetate.

On the other hand when the glacial acetic acid, boron fluoride, anhydrous hydrogen fluoride and propylene were charged to the bomb in the order stated no immediate temperature rise was noted. When the bomb in this case was heated to a temperature of about 100° C. a rapid reaction was noted which appeared to be complete in about 10 to 15 minutes as shown by the following data:

| Time | Temperature, °C. | Pressure, p. s. i. |
|---|---|---|
| 0 | 70 | 300 |
| 5 minutes | 87 | 350 |
| 10 minutes | 104 | 360 |
| 12 minutes | 121 | 150 |
| 14 minutes | 119 | 100 |
| 19 minutes | 108 | 80 |

The reaction started in about 5 minutes and was substantially completed in less than 15 minutes. When the bomb was cooled practically no residual gas was found. The crude reaction mixture, which weighed 864 grams, was treated with ice and water, whereupon two layers were formed. The upper, organic layer was washed with aqueous sodium carbonate until all acidic material was removed, then washed with water and dried over anhydrous calcium chloride. This layer was then purified by distillation and the fraction boiling at 87–89° C. was collected as pure isopropyl acetate. The yield in this case was 591 grams or about 72% based on the amount of acetic acid charged.

Our invention is not limited to the use of a batch process as hereinabove described but may be employed on a continuous or semi-continuous basis provided that the boron fluoride in all cases be intimately admixed with the organic acid to be reacted prior to any contacting of the boron fluoride catalyst with olefin.

While we have disclosed propylene in the above example it should be understood that other olefins may be employed in the esterification reaction. Open chain olefins may be employed such as butylene, amylene, 1-hexene, the isomeric 2- or 3-hexenes, 1-heptene, 1-octene, caprylene, etc., tertiary olefins usually being less desirable than secondary olefins. The olefin may be an aromatic or naphthenic hydrocarbon with an unsaturated side chain. Particularly desirable are cyclo olefins such as cyclopentene and alkyl cyclopentenes such as the isomeric methylcyclopentenes, dimethylcyclopentenes, ethylcyclopentenes, and propylcyclopentenes, as well as cyclohexene and its homologues. Similarly terpene hydrocarbons may be employed, for example, pinene, camphene, and the like. Dicyclic hydrocarbons may be used with the double bond in either or both of the rings or in alkyl groups attached to said rings. We also contemplate the use of diolefins such as butadiene, pentadiene, isoprene, dipropenyl, etc., and olefins of the general classes hereinabove described which contain more than one double bond.

Instead of acetic acid as described in the above example, we may employ other fatty acids such as formic, propionic, butyric, valeric, caproic, caprylic, etc., or the higher members of the series such as lauric, myristic, palmitic, margaric and stearic acids. Aromatic acids such as benzoic acid may be employed. Unsaturated mono-basic acids such as acrylic and oleic and even acids with two double bonds such as linoleic may be employed. Poly-basic acids such as oxalic, malonic, succinic and unsaturated di-basic acids such as fumaric, maleic, etc., and hydroxy acids such as citric, tartaric and malic are also contemplated.

Instead of the acids themselves we may employ the corresponding anhydrides. Substituted acids such as mono-, di- and trichloroacetic acids, nitrobenzoic acids, etc., may be used. When the acids are normally solid, they may be dissolved in an inert diluent or employed in finely divided state mechanically suspended in catalyst liquid. Instead of olefins per se we may employ unsaturated alcohols, unsaturated esters or unsaturated ketones. Since any of the olefins of the classes hereinabove set forth may be reacted with any of the acids it will be evident that a wide variety of esters may be produced.

Regardless of the particular catalyst, olefin and acid employed we add the catalyst to the acid before adding the olefin since this particular order has been found to be of great importance in obtaining the desired ester formation. The most favorable reaction temperature depends on the nature of the olefin and the acid employed. In general, temperatures between 0° C. and 300° C. may be used but we prefer to use temperatures between 50° C. and 200° C. Temperatures of the order of about 100 to 125° C. have been found to be particularly satisfactory for the reaction of propylene with acetic acid to give isopropyl acetate. The pressure in all cases should be sufficient to maintain the reaction mixture largely as a liquid phase and substantially to suppress vaporization.

Our preferred catalyst as hereinabove stated is a mixture of boron fluoride and a hydrogen halide such as hydrogen fluoride, hydrogen chloride or hydrogen bromide. About equal parts by weight may be employed of the boron fluoride and hydrogen halide respectively although the proportions of these components may vary within a relatively wide range, e. g. 1:10 to 10:1. Satisfactory results are usually obtained by the use of 2 to 20% by weight of catalyst based on the olefin-acid mixture although here again the proportions may vary within a relatively wide range. Very high proportions of catalyst to acid and olefin may, however, be used.

While we have described a preferred example of our invention and set forth particular reaction conditions it should be understood that these conditions are set forth by way of illustration and not by way of limitation.

We claim:

1. The method of reacting an organic acid with a secondary olefin which comprises intimately admixing with said acid a catalyst comprising boron fluoride and a hydrogen halide and subsequently contacting the resultant mixture under conversion conditions with a secondary olefin.

2. The method of claim 1 wherein the hydrogen halide is hydrogen chloride.

3. The method of claim 1 wherein the hydrogen halide is hydrogen fluoride.

4. The method of producing an ester from an organic acid and an olefin by use of a boron fluoride-hydrogen halide catalyst which method comprises admixing boron fluoride with said organic acid in the absence of any substantial amount of olefins and at a sufficiently low temperature to avoid conversion, subsequently adding an olefin having a greater molecular weight than ethylene to said mixture and heating said mixture in the presence of added hydrogen halide to a temperature sufficient to effect the production of an ester while maintaining a pressure sufficient to maintain substantially liquid phase conversion conditions.

5. The method of claim 4 wherein the olefin is a secondary olefin.

6. The method of producing an ester by reacting an organic acid with a secondary olefin which method comprises intimately admixing boron fluoride with said acid and subsequently contacting said mixture under conversion conditions with a secondary olefin in the presence of a hydrogen halide.

7. The method of claim 6 wherein the hydrogen halide is hydrogen chloride.

8. The method of claim 6 wherein the hydrogen halide is hydrogen fluoride.

9. The method of producing an ester from an organic acid and an olefin by the use of a boron fluoride-hydrogen halide catalyst, which method comprises admixing boron fluoride with said organic acid in the absence of any substantial amounts of olefins and at a sufficiently low temperature to avoid conversion, subsequently adding an olefin having a greater molecular weight than ethylene to said mixture and heating said mixture in the presence of added hydrogen halide to a temperature in the range of about 50° C. to about 200° C. to effect the production of an ester while maintaining a pressure sufficient to maintain substantially liquid phase conversion conditions, and separating an ester from the mixture of conversion products.

10. The method of claim 9 wherein the olefin is a secondary olefin.

11. A method for the production of isopropyl acetate unaccompanied by propylene polymers and higher fatty acids which comprises preparing a conversion mixture by admixing boron fluoride with acetic acid in the absence of any substantial amount of propylene at a sufficiently low temperature to avoid conversion, adding anhydrous hydrogen fluoride and subsequently adding propylene, heating the resultant conversion mixture to a temperature in the range of about 100° C. to about 125° C. under sufficient pressure to maintain substantially liquid phase conversion conditions, and thereafter separating isopropyl acetate from the conversion mixture.

ARTHUR E. BEARSE.
RICHARD D. MORIN.